(12) United States Patent
Foster et al.

(10) Patent No.: US 9,875,726 B2
(45) Date of Patent: Jan. 23, 2018

(54) HYBRID-IMAGE DISPLAY DEVICE

(71) Applicants: Neil Andrew Foster, Etobicoke (CA); Gregory Scott Mardon, Keswick (CA)

(72) Inventors: Neil Andrew Foster, Etobicoke (CA); Gregory Scott Mardon, Keswick (CA)

(*) Notice: Subject to any disclaimer, the term of this patent is extended or adjusted under 35 U.S.C. 154(b) by 0 days.

(21) Appl. No.: 15/501,414

(22) PCT Filed: May 13, 2016

(86) PCT No.: PCT/IB2016/052802
§ 371 (c)(1),
(2) Date: Feb. 2, 2017

(87) PCT Pub. No.: WO2016/189413
PCT Pub. Date: Dec. 1, 2016

(65) Prior Publication Data
US 2017/0236491 A1    Aug. 17, 2017

Related U.S. Application Data

(60) Provisional application No. 62/167,113, filed on May 27, 2015.

(51) Int. Cl.
*G09G 5/14* (2006.01)
*G02B 27/22* (2006.01)
(Continued)

(52) U.S. Cl.
CPC .............. *G09G 5/14* (2013.01); *G02B 27/22* (2013.01); *G06F 3/04845* (2013.01);
(Continued)

(58) Field of Classification Search
CPC .... G02B 27/10; H04N 9/3105; H04N 9/3164; G03B 21/10
See application file for complete search history.

(56) References Cited

U.S. PATENT DOCUMENTS 5,639,151 A * 6/1997 McNelley .............. G03B 15/10
348/14.07
8,199,185 B2 * 6/2012 McNelley .......... G02B 27/2292
348/14.16
(Continued)

FOREIGN PATENT DOCUMENTS

EP           0559889 A4    2/1993
WO    2009138741 A2    11/2009

OTHER PUBLICATIONS

"International Search Report", dated Aug. 5, 2016, PCT Application No. PCT/IB2016/052802, filed May 13, 2016.

*Primary Examiner* — Sepehr Azari
(74) *Attorney, Agent, or Firm* — Perry + Currier, Inc.

(57) ABSTRACT

According to an implementation of the present specification there is provided an apparatus for creating a hybrid image. The apparatus comprises: a first light source configured to emit a first light in a first direction; a reflector disposed to intercept the first light and configured to at least partially reflect the first light in an output direction to produce a reflected first light. The apparatus also comprises a second light source configured to emit a second light, the reflector configured to at least partially transmit the second light in the output direction to produce a transmitted second light. The apparatus also comprises an input terminal configured to receive an input used to control one or more of the first light source and the second light source. The hybrid image comprises a combination of the reflected first light and the transmitted second light.

23 Claims, 11 Drawing Sheets

(51) Int. Cl.
*G06F 3/0488* (2013.01)
*G06F 3/0484* (2013.01)
*G06Q 30/02* (2012.01)
*G06Q 20/34* (2012.01)

(52) U.S. Cl.
CPC ....... *G06F 3/04886* (2013.01); *G06Q 20/347* (2013.01); *G06Q 30/0241* (2013.01); *G09G 2354/00* (2013.01)

(56) References Cited

U.S. PATENT DOCUMENTS

| | | | |
|---|---|---|---|
| 9,563,910 B2* | 2/2017 | Lee | G06F 3/04886 |
| 2002/0008675 A1* | 1/2002 | Mayer, III | G06F 3/1446 |
| | | | 345/4 |
| 2003/0046166 A1 | 3/2003 | Liebman | |
| 2007/0058144 A1 | 3/2007 | Olsen et al. | |
| 2012/0007839 A1* | 1/2012 | Tsao | G02B 26/00 |
| | | | 345/204 |
| 2013/0169551 A1 | 7/2013 | Park et al. | |
| 2014/0192281 A1* | 7/2014 | Smithwick | G02F 1/1313 |
| | | | 349/15 |

* cited by examiner

HYBRID-IMAGE DISPLAY DEVICE

CROSS-REFERENCE TO RELATED APPLICATIONS

This application claims priority from U.S. Provisional Patent Application No. 62/167,113 filed on May 27, 2015, which is incorporated herein by reference in its entirety.

FIELD

The present specification relates to interactive hybrid-image display devices and methods, and more particularly to retail marketing interactive hybrid-image display devices and methods.

BACKGROUND

Generally retail customers want to visually examine and interact with a product before making the decision to purchase that product. However, conventional retail presentation of products has several limitations that restrict the ability of a customer to examine and interact with a product. First, the limited shelf space in a store presents a physical limit to the number of products that can be conveniently presented to the customer. Second, when a visual representation of a product is presented on a paper flyer or a conventional in-store screen, these visual representations often lack sufficient detail and do not allow the customer to interact with and examine the product through its visual representation. Third, product packaging, especially packaging intended to be tamper-proof or to protect the integrity of products, can present a further obstacle to potential customers' ability to examine and interact with the product.

SUMMARY

According to an implementation of the present specification there is provided an apparatus for creating a hybrid image. The apparatus comprises: a first light source configured to emit a first light in a first direction; a reflector disposed to intercept the first light, the reflector configured to at least partially reflect the first light in an output direction to produce a reflected first light; a second light source configured to emit a second light, the reflector configured to at least partially transmit the second light in the output direction to produce a transmitted second light; and an input terminal configured to receive an input used to control one or more of the first light source and the second light source. The hybrid image comprises a combination of the reflected first light and the transmitted second light.

The input terminal can comprise a control screen configured to display a user interface; and the input can comprise a touch input received through the user interface.

The second light source can comprise a first portion of a display disposed on a side of the reflector opposite the output direction, the first portion covered by the reflector; and the control screen can comprise a second portion of the display, the second portion extending beyond a perimeter of the reflector thereby allowing the second portion to receive the touch input unobstructed by the reflector.

The user interface can comprise one or more dynamic input zones configured to receive the touch input, receiving the touch input triggering changes in an appearance of at least one of the input zones.

The reflector can be disposed at about 45° to the first direction.

The apparatus can further comprise one or more of a motion sensor and a proximity sensor configured to sense motion and proximity respectively in the vicinity of the apparatus.

The second light source can comprise a display oriented about parallel to the reflector.

The apparatus can further comprise: a first surface disposed at a first angle to the reflector, the first surface disposed on a side of the reflector opposite the output direction; and a first surface light source configured to illuminate at least a portion of the first surface.

The apparatus can further comprise: a second surface disposed at a second angle to the reflector, the second surface disposed on the side of the reflector opposite the output direction, the second angle different from the first angle; and a second surface light source configured to illuminate at least a portion of the second surface.

At least one portion of one or more of the first surface and the second surface can be at least partially translucent to human-visible light, the at least one portion configured to be backlit by its corresponding one of the first surface light source and the second surface light source.

One or more of the first surface and the second surface can comprise one or more of a fabric and an acrylic material.

One or more of the first surface light source and the second surface light source can be controlled by the input.

The hybrid image can comprise the combination of the reflected first light and the transmitted second light combined with one or more of a first surface light emanating from the first surface and a second surface light emanating from the second surface.

The apparatus can further comprise a sound emitter controlled by the input.

The apparatus can further comprise an output terminal configured to connect to auxiliary sources of one or more of light, sound, smell, physical movement, and materials, the auxiliary sources external to the apparatus, the output terminal configured to allow the input to control one or more of the auxiliary sources.

The apparatus can further comprise one or more of a payment information reader and an identification information reader configured to read payment information and identification information respectively and control one or more of the first light source and the second light source based on one or more of the payment information and the identification information.

According to another implementation of the present specification there is provided a method of creating a hybrid image, the method comprising: receiving an input at an input terminal; controlling one or more of a first light source emitting a first light and a second light source emitting a second light based on the input; producing a reflected first light by at least partially reflecting the first light from a reflector; producing a transmitted second light by at least partially transmitting the second light through the reflector; and creating the hybrid image comprising a combination of the reflected first light and the transmitted second light.

The input terminal can comprise a control screen; and the receiving the input can comprise displaying a user interface on the control screen; and receiving a touch input at the control screen.

The second light source can comprise a first portion of a display and the control screen can comprise a second portion of the display.

The method can further comprise: displaying one or more dynamic input zones on the control screen, the dynamic input zones configured to receive the touch input; and changing an appearance of at least one of the input zones in response to the touch input.

The method can further comprise: sensing one or more of motion and proximity in the vicinity of one or more of the first light source, the second light source, and the reflector; and controlling one or more of the first light source and the second light source based on one or more of the sensed motion and proximity.

The method can further comprise one or more of: illuminating a first surface using a first surface light source, the first surface disposed at a first angle to the reflector; and illuminating a second surface using a second surface light source, the second surface disposed at a second angle to the reflector, the second angle different from the first angle. The hybrid image can comprise the combination of the reflected first light and the transmitted second light combined with one or more of: a first surface light emanating from the first surface and transmitted through the reflector, and a second surface light emanating from the second surface and transmitted through the reflector.

The method can further comprise controlling one or more of the first surface light source and the second surface light source based on the input.

The method can further comprise producing, using a sound emitter, one or more sounds based on the input.

The method can further comprise synchronizing with each other two or more of the first light source, the second light source, the first surface light source, the second surface light source, and the sound emitter to produce a hybrid presentation.

One or more of the first light source and the second light source can comprise a display having a plurality of pixels; and the controlling can comprise selecting, based on the input, one or more of a given set of one or more images from a library of sets of images for being displayed by one or more of the first light source and the second light source; and a given number of and given coordinates of the pixels of one or more of the first light source and the second light source for displaying the given set of one or more images.

The method can further comprise controlling, based on the input, one or more auxiliary sources of one or more of light, sound, smell, physical movement, and materials.

BRIEF DESCRIPTION OF THE DRAWINGS

Implementations of the present specification will now be described, by way of example only, with reference to the attached Figures, wherein:

FIG. 5 also shows a selection of otherwise obscured other internal components, shown in dashed lines.

DETAILED DESCRIPTION

The present specification discloses a display device capable of forming an interactive, hybrid image which can include, but is not limited to, an interactive hybrid image of an object or a product. This display device can allow a large number of products to be presented to potential customers without the need for additional retail shelf space for each additional product. This hybrid image can produce in a viewer the perception that the hybrid image has depth and/or is three-dimensional (3D). Moreover, since the 3D image is interactive, the potential customer can manipulate the image and examine the visual details of the product from multiple perspectives unhindered by any product packaging. The present specification also discloses a method of forming such interactive 3D hybrid images.

Figure 1:
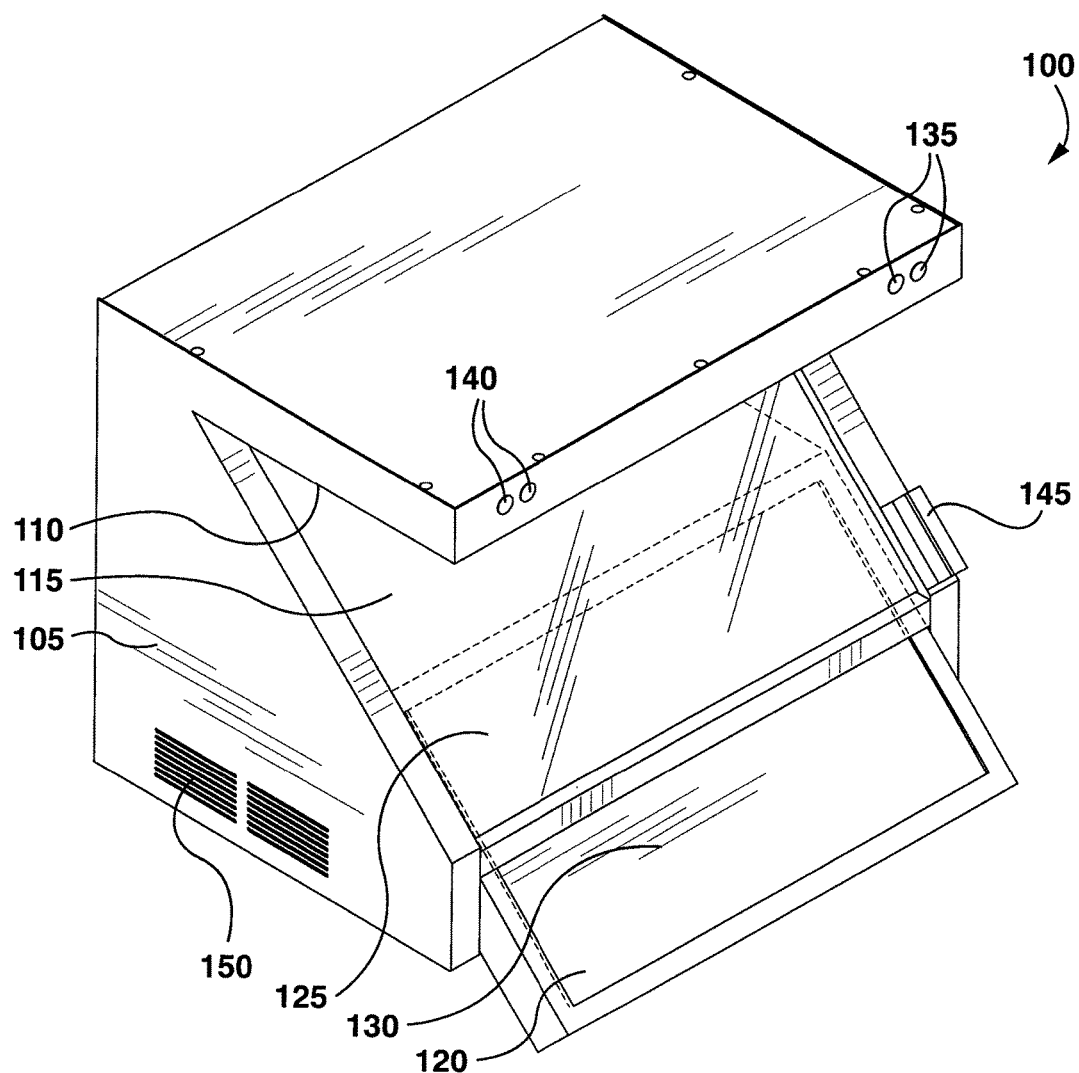
FIG. 1 depicts a top perspective view of an exemplary hybrid-image display device, according to non-limiting implementations.

FIG. 1 shows an exemplary hybrid-image display device 100 comprising a housing 105 which supports a first display 110, a reflector 115, and a second display 120. First display 110 and/or second display 120 can comprise LCD, LED, OLED, plasma, or any other suitable type of display. Reflector 115 is disposed at an acute angle to first display 110. Second display 120 is disposed on the side of reflector 115 opposite the side closest to first display 110. Reflector 115 partially overlaps second display 120 such that a first portion 125 of display 120 is covered by reflector 115. A second portion 130 of display 120 extends beyond a perimeter of reflector 115, and as such is not covered or obstructed by reflector 115. As will be described in greater detail below, reflector 115 reflects at least a portion of a light emitted by first display 110 and transmits at least a portion of the light emitted by first portion 125 of second display 120. The combination and/or layering of the reflected light and the transmitted light forms a hybrid image which can appear to the viewer as having depth and/or being 3D. Second portion 130 of display 120 can be used as a control screen to display a user interface and to receive touch input from a user/viewer. Hereafter, "user" and "viewer" are used interchangeably. The touch input can be used to control first display 110 and/or second display 120, thereby controlling the hybrid image and allowing the user to manipulate the hybrid image. This, in turn, can allow a user to interact with the hybrid image.

Device 100 can further comprise optional sensors to sense its external environment, including the presence of a user. For example, device 100 can comprise proximity sensors 135 to detect whether a user is nearby. In addition and/or instead, device 100 can comprise motion sensors 140 to detect movement in its proximity. One or a combination of these sensors can be used by device 100 to detect a user and to produce a response. For example, the response can comprise turning on or waking up device 100 to capture the attention of a nearby user for potential retail marketing purposes.

Device 100 can also comprise an optional magnetic card reader 145 that can be used to read information from cards including, but not limited to, identification, loyalty, rewards, gift, and/or payment cards. In some implementations, card reader 145 can also write information back onto these cards. This information can also be used to control one or more of the first display 110 and the second display 120, in order to control the hybrid image.

Device 100 can also comprise one or more optional openings 150 in one or more of its side panels. Openings 150 can allow for air circulation into and out of housing 105 to cool the electronic components inside housing 105. In addition, openings 150 can allow sound generated by any speakers inside housing 105 to more easily exit housing 105.

Figure 2:
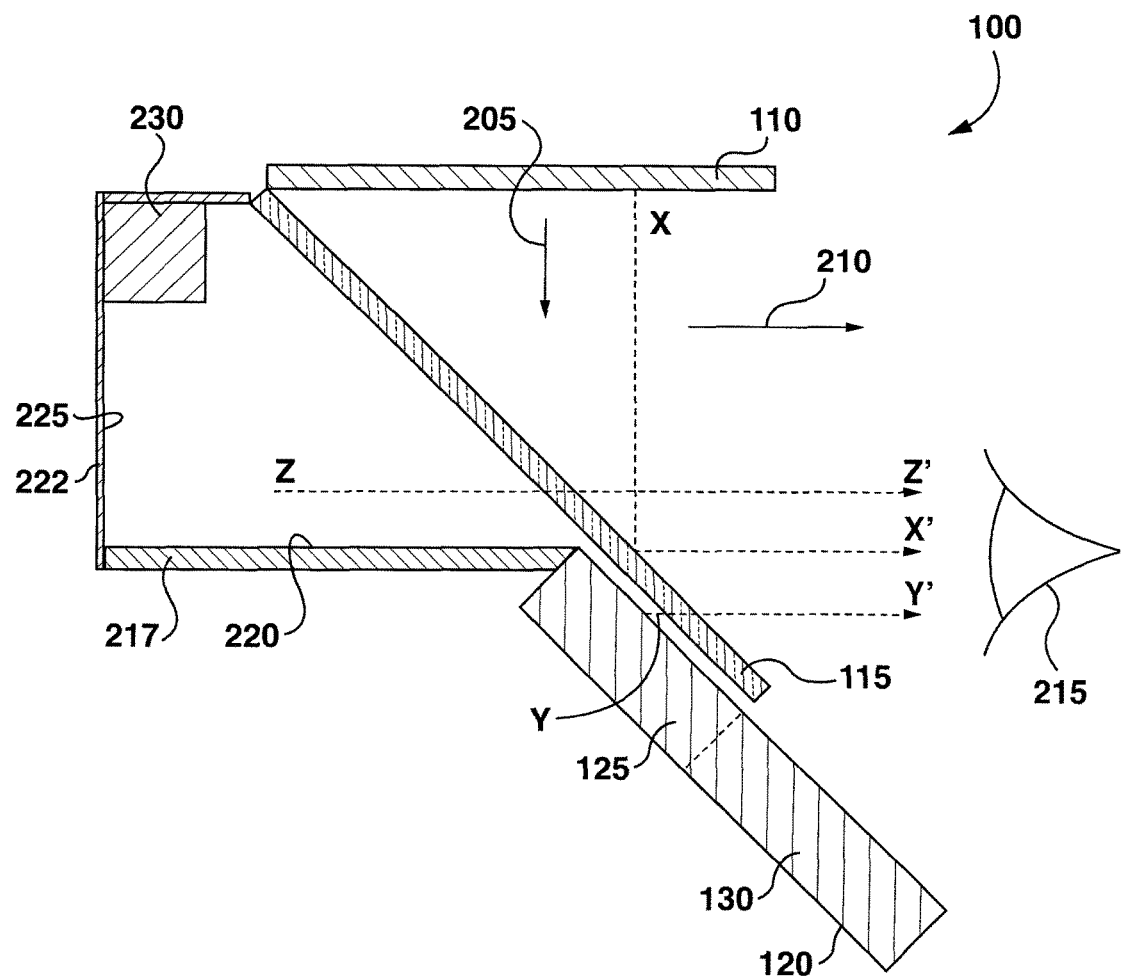
FIG. 2 depicts a schematic, side elevation, cross-section of a portion of the device of FIG. 1.

FIG. 2 shows in cross-section a schematic drawing of a portion of device 100, and depicts the light rays that can form the hybrid image. First display 110 emits light X in the first direction 205. Light X propagates towards reflector 115, which intercepts light X and at least partially reflects light X to form reflected light X' propagating in an output direction 210 and towards viewer 215. First portion 125 of second display 120 emits light Y, which is at least partially transmitted by reflector 115 to form transmitted light Y' also propagating in the output direction 210 towards viewer 215. The combination and/or layering of reflected light X' and transmitted light Y' forms the hybrid image which can be perceived by viewer 215 as having depth or a 3D quality.

It is contemplated that reflected light X' can be substantially the same as light X, except for its direction. It is also contemplated that transmitted light Y' can be substantially the same as light Y.

Second portion 130 of display 120 can be used to display a user interface for receiving input from viewer 215. In addition second portion 130 of display 120 can be used to act as an input terminal for receiving a touch input from viewer 215, which touch input can be used to control one or more of first display 110 and second display 120, thereby controlling and manipulating the hybrid image. The touch input can include, but is not limited to, single or multi finger touch, gestures, swipes, force-sensitive touch, and/or single or multi object touch such as touch by a stylus or an electronic pen or controller. The receiving of touch input can allow viewer 215 to interact with the hybrid image; for example to zoom, rotate, translate, transform, actuate, or activate the object represented in the hybrid image. This in turn can allow viewer 215 to view and/or examine the object represented in the hybrid image from different directions and perspectives, and in different states.

Although FIG. 2 shows one output direction 210, viewing angles of device 100 are not limited to output direction 210. It is contemplated that output directions can comprise a range of directions away from reflector 115 and outwardly of device 100 in which a potential viewer can perceive at least some of the light from first display 110 as reflected from reflector 115 and at least some of the light from first portion 125 of second display 120 transmitted through reflector 115.

Optionally, other backlight Z can also be transmitted through reflector 115 to form transmitted back light Z' propagating in the output direction 210 towards viewer 215. Transmitted back light Z' can combine with reflected light X' and transmitted light Y' to contribute to the formation of the hybrid image. It is contemplated that in some implementations transmitted light Z' can be substantially the same as light Z.

Backlight Z can be emitted by any number of suitable sources. For example, optionally device 100 can comprise a base 217 disposed on the side of reflector 115 opposite output direction 210 (i.e. the side of reflector 115 opposite the side closest to first display 110). As shown in FIG. 2, base 217 can be disposed at an acute angle to reflector 115. The angle can be about 45°. Base 217 can define a surface 220 which can be illuminated by an optional corresponding internal surface light source 230. The resulting light emanating from surface 220 can form all or a portion of backlight Z. In addition, optionally, device 100 can comprise a back 222 disposed on the side of reflector 115 opposite output direction 210. As shown in FIG. 2, back 222 can be disposed at an acute angle to reflector 115. The angle can be about 45°. Back 222 can define a surface 225 which can be illuminated by a corresponding internal light source, such as surface light source 230. The resulting light emanating from surface 225 can also form all or a portion of backlight Z. In some implementations, light emitted by surface light source 230 itself can directly form all or a portion of backlight Z.

In some implementations, at least a portion of one or more of base 217 and back 222 can be at least partially translucent to human-visible light and can be backlit by an internal light source located outside of the space defined by reflector 115, base 217, and back 222. For example, one or more of base 217 and back 222 can comprise fabric, acrylic, or other suitable materials. While the internal surface light source is shown as being located in one corner of the space defined by reflector 115, base 217, and back 222, it is contemplated that surface light source 230 can be located in any suitable location in that space. Surface light source 230, and any other similar surface light sources, can also be controlled by the input received from the user at second portion 130 of second display 120.

In device 100, reflector 115 is disposed at about 45° to first direction 205 of light X emitted by first display 110. This angle can reduce stray reflections in device 100. In other implementations, reflector 115 can form an angle with first direction 205 of light X that is between about 30° and about 60°. In yet other implementations, reflector 115 can form an angle with first direction 205 of light X that is greater than about 60° or less than about 30°. In some implementations, the angle between reflector 115 and first direction 205 of light X can be adjustable, which can allow for adjusting optimal viewing directions and the hybrid image.

In device 100, first portion 125 of second display 120 is oriented about parallel to reflector 115 to reduce optical artifacts. However, it is contemplated that first portion 125 can be oriented at any acute angle to reflector 115. In addition, FIG. 2 shows a small gap between first portion 125 and reflector 115. However, it is contemplated that first portion 125 can be adjacent to and/or in contact with reflector 115.

Reflector 115 can be shaped as a plate, a sheet, or other optically suitable shape. Reflector 115 generally comprises a material that can reflect at least a portion of the light X incident upon it, while transmitting at least a portion of the light Y existing on the side of the reflector 115 opposite the side receiving the light X. Reflector 115 can comprise, but is not limited to, a glass material, a plastic material, a glass composite material, and/or a plastic composite material. Reflector 115 can comprise an at least partially transmissive glass or plastic matrix having embedded within it a set of oriented reflective particles. These reflective particles can comprise metallic flakes. Reflector 115 can comprise Peppers Ghost glass, treated glass, and/or optical hologram film.

Figure 3:
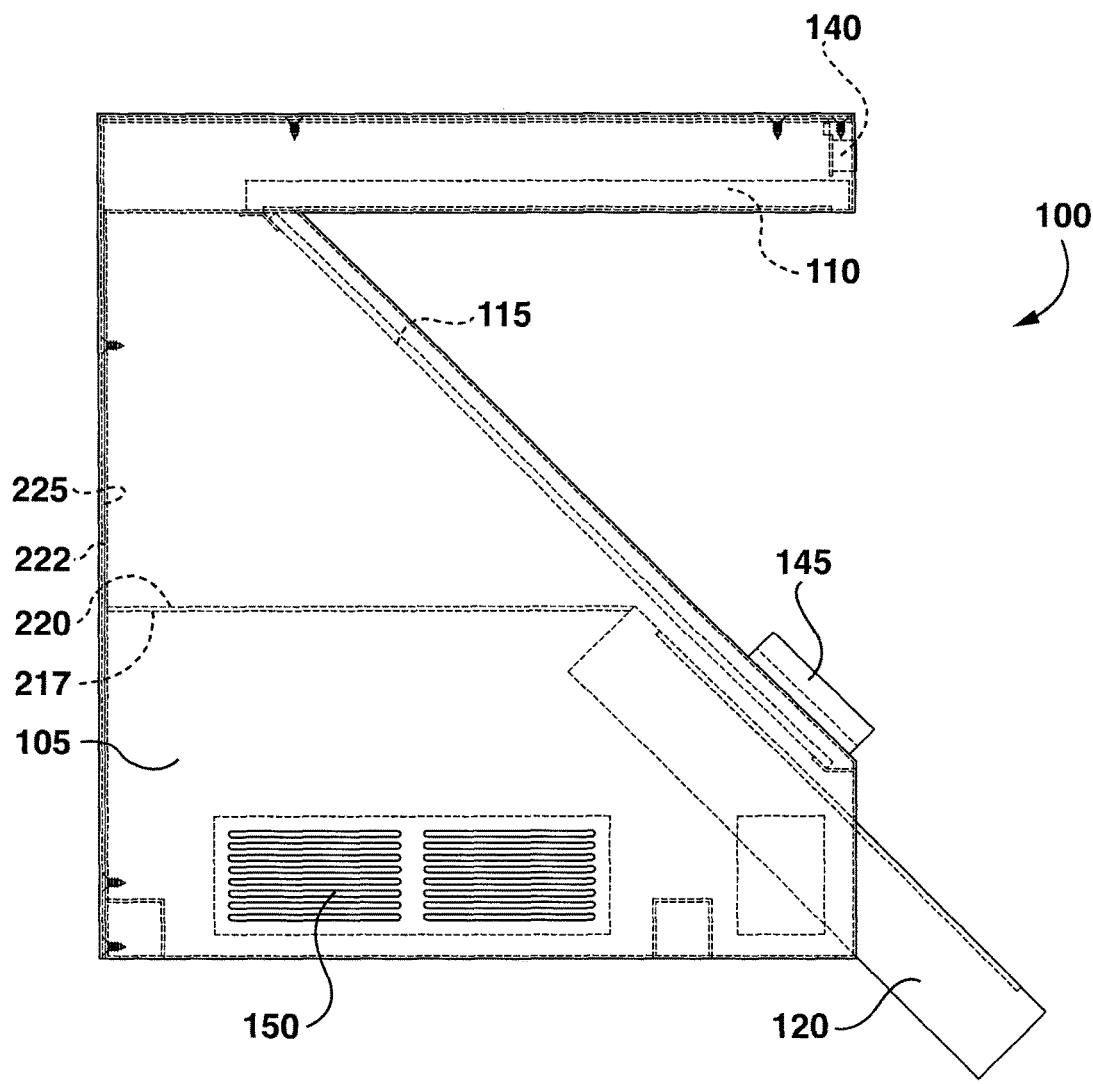
FIG. 3 depicts a side elevation view of the device of FIG. 1, with a selection of internal components shown in dashed lines.

FIG. 3 shows a side elevation view of device 100, with a selection of the internal components shown in dashed lines. FIG. 3 shows housing 105 supporting first display 110, reflector 115, and second display 120. FIG. 3 also shows motion sensor 140, card reader 145, and openings 150 of device 100. In addition, FIG. 3 shows base 217 defining surface 220 and back 222 defining surface 225.

Figure 4:
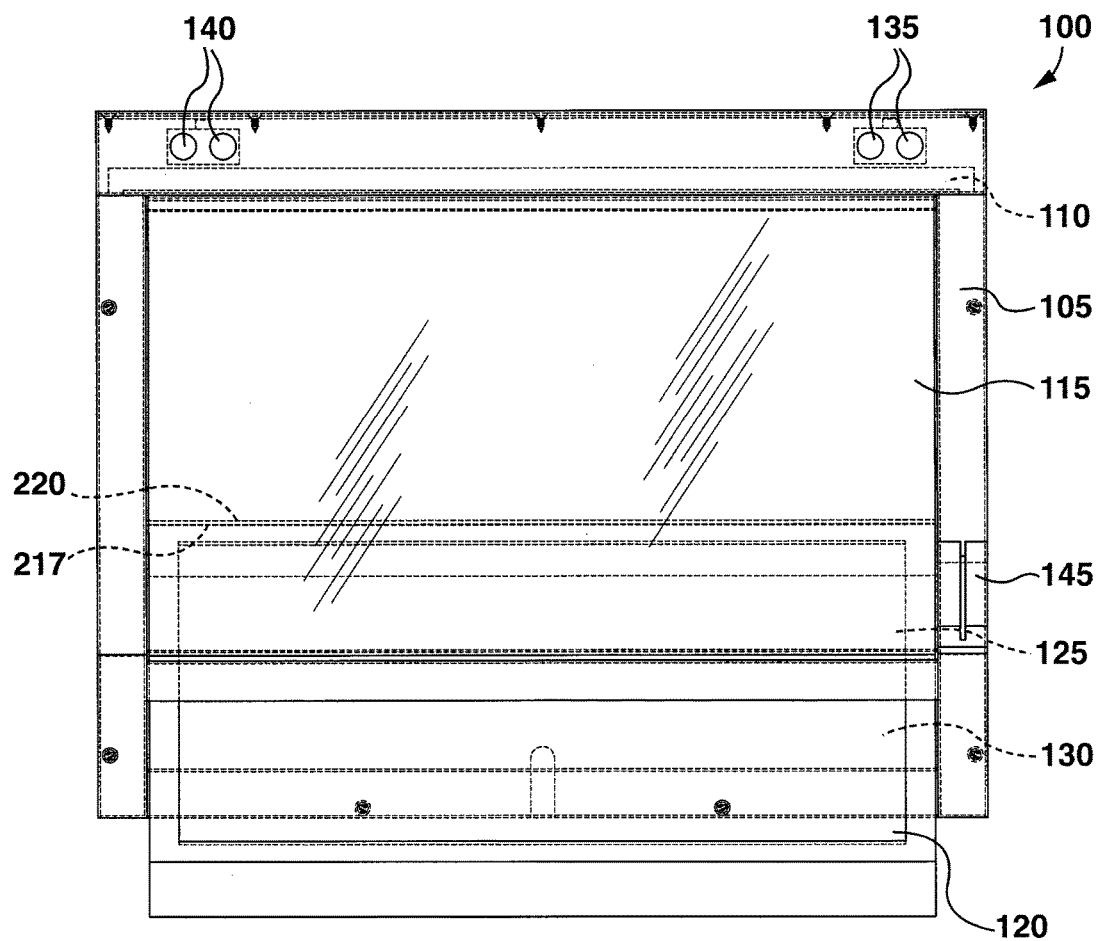
FIG. 4 depicts a front elevation view of the device of FIG. 1, with a selection of internal components shown in dashed lines.

FIG. 4 shows a front elevation view of device 100, with a selection of the internal components shown in dashed lines. FIG. 4 shows housing 105 supporting first display 110, reflector 115, and second display 120 having a first portion 125 and second portion 130. First portion 125 is shown in dashed lines as it is covered by reflector 115. Base 217 defining surface 220 is also depicted. Proximity sensors 135 and motion sensors 140 are also shown secured to an upper portion of housing 105 near first display 110. Magnetic card reader 145 is also visible, secured to housing 105 on one side of reflector 115.

Figure 5:
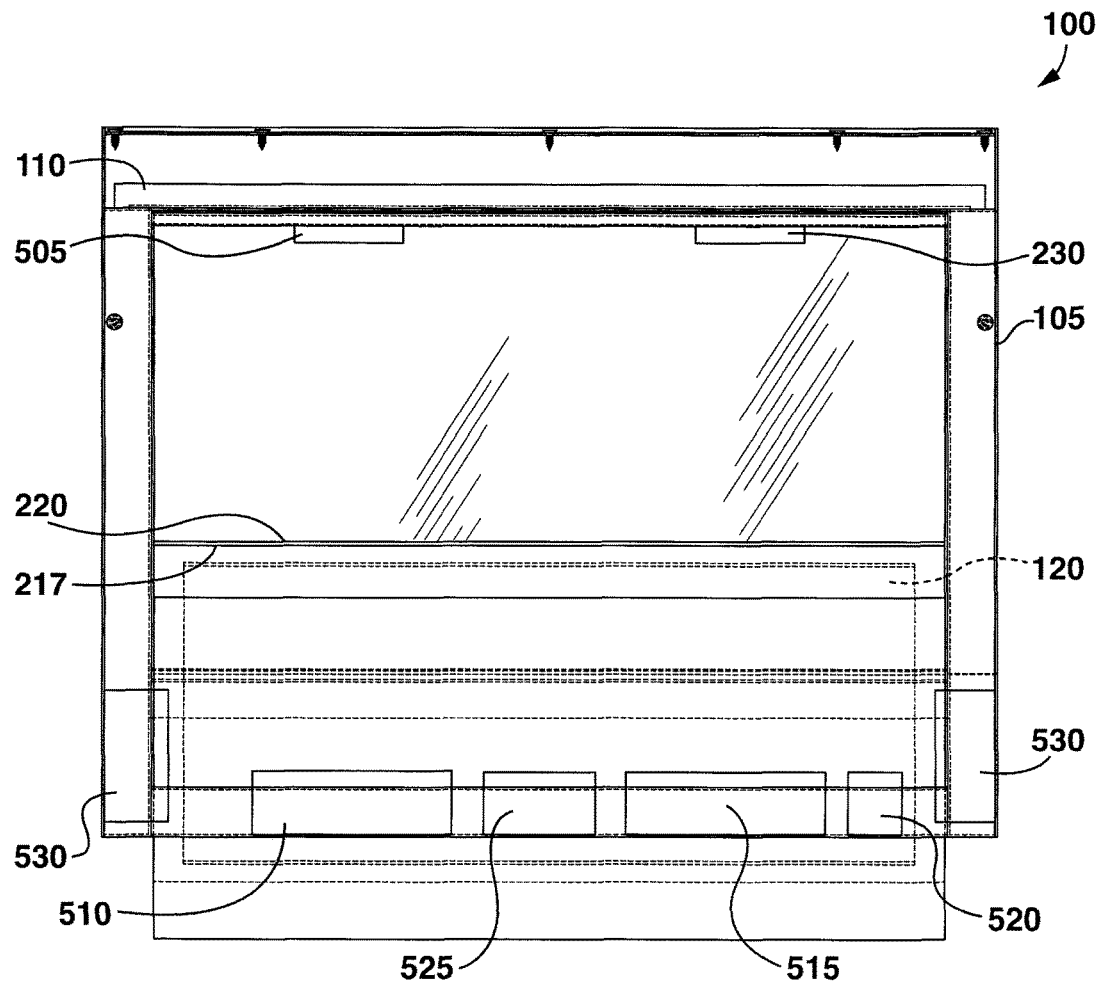
FIG. 5 depicts a rear elevation view of the device of FIG. 1, with a rear outer panel of the device removed to reveal some internal components.

FIG. 5 shows a rear elevation view of device 100, with a rear outer panel removed to reveal a selection of internal components of device 100. A selection of other internal components that would otherwise be obscured from view is shown in dashed lines. FIG. 5 shows housing 105 supporting first display 110. Internal surface light source 230 is secured to a portion of housing 105, such that internal surface light source 230 can illuminate surface 225 defined by back 222 (surface 225 and back 222 not visible in FIG. 5, but shown in FIG. 3). An optional second internal surface light source 505 is also secured to housing 105, and can be configured to illuminate surface 220 defined by base 217. Surface light source 230 can also be referred to as "back light" and surface light source 505 can also be referred to as "stage light". In some implementations, one or more of the back light and the stage light can be controlled by the input received from the user.

FIG. 5 also shows controllers 510,515 configured to control the images displayed by first display 110 and second display 120. Controllers 510,515 can comprise a memory and processors such as a Central Processing Unit and/or a Graphics Processing Unit. In some implementations, controllers 510,515 can comprise a video decoding unit capable of decoding two videos simultaneously. Controllers 510,515 can receive the input from the user (e.g. received at second portion 130 of second display 120) and determine what image or images are to be displayed on first display 110 and second display 120. Controllers 510,515 can also determine what images are displayed on first portion 125 of second display 120 and what user interface is displayed on second portion 130 of second display 120 (first portion 125 and second portion 130 not labeled in FIG. 5, but labeled in FIG. 4), which can also be determined based on the input received from the user. Input from the user is not limited to input received at second portion 130 of second display 120, and can include, but is not limited to, data received through barcode scanners, motion sensors, RFID, GPIO and USB button controls, IR remote controls, serial devices, keyboards and mice.

Controllers 510 and 515 can each control a corresponding one of first display 110 and second display 120. In some implementations, device 100 can comprise only one controller to control all the displays. While device 100 is shown as having onboard memory and/or processors in the form of controllers 510,515, it is contemplated that device 100 can have no onboard memory and/or processors, i.e. have no controllers. Alternatively, the memory and/or processors can be integrated into each corresponding display; for example, one or more of first display 110 and second display 120 can comprise a tablet such as an iPad™.

Device 100 can also comprise an optional GPS locator 520 that can be used to track the location of device 100. If device 100 is implemented as part of a mobile marketing unit, GPS locator 520 can be used to tailor or customize based on the location of device 100 the content displayed by one or more of first display 110 and second display 120. An example of a mobile marketing unit can comprise, but is not limited to, a truck or other vehicle transporting marketing materials, messages, and/or devices to various locations.

Device 100 can also comprise an optional circuit board and/or microcontroller 525 configured to communicate on/off and RGB commands to one or more of first internal surface light source 230 and second internal surface light source 505. Microcontroller 525 can receive commands from one or more of controllers 510,515 and in response send programmed responses to internal surface light sources 230 and 505. In some implementations, these internal light sources can be controlled directly by one or more of controllers 510,515, which can send on/off and other commands directly to internal surface light sources 230 and 505.

Device 100 can also comprise one or more optional sound emitters 530, which can comprise, but are not limited to, speakers. Sound emitters 530 can be controlled by one or more of controllers 510,515 and can be activated and/or controlled based on the input from the user. Sound emitters 530 can also be controlled by input from sensors incorporated in device 100 and/or based on internal programming of controllers 510,515. In some implementations, controllers 510,515 can be configured to synchronize the sound emitted from sound emitters 530 with images and/or video displayed by one or more of first display 110 and second display 120 to create a hybrid audio-visual presentation.

Housing 105 of device 100 can be made of materials comprising metals or any other sufficiently rigid and strong material such as high-strength plastic, wood, and the like. In some implementations, housing 105 can comprise one or more panels removably secured to a structural frame. Removable panels can allow for easy access to internal components of device 100 to service and/or exchange those components.

Figure 6:
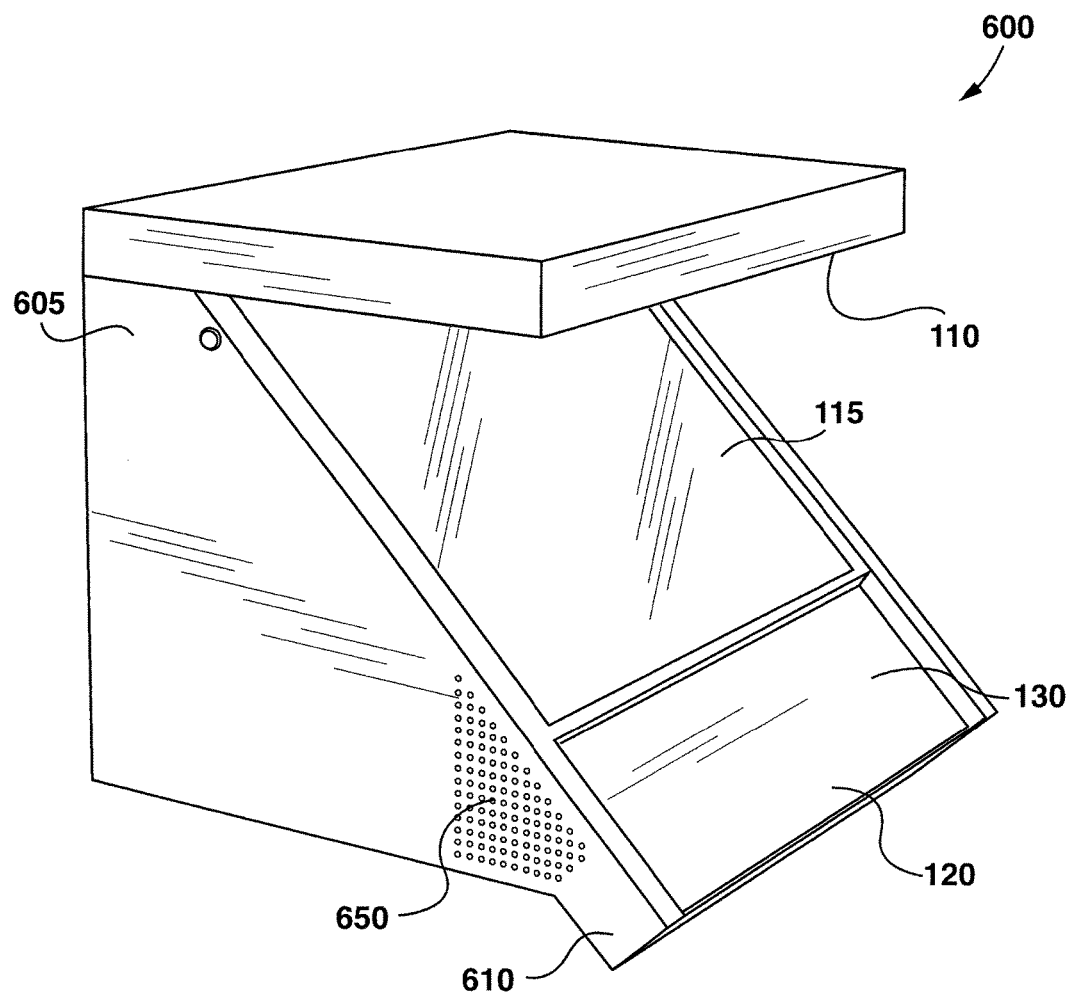
FIG. 6 depicts a top perspective view of another exemplary hybrid-image display device, according to non-limiting implementations.

FIG. 6 shows a top perspective view of another implementation of hybrid-image display device 600, which is generally similar to device 100. The differences between device 600 and device 100 are described in greater detail below. Device 600 comprises a housing 605 supporting first display 110, reflector 115, and second display 120. Housing 605 comprises a display guard 610 which surrounds the edges of second portion 130 of second display 120. Display guard 610 can protect second display 120 from impact by users, shopping carts, and other objects and forces external to device 600. It is also contemplated that display guard 610 can surround a subset or all of the exposed edges of second portion 130 of second display 120. Device 600 can also comprise openings 650 to facilitate sound generated inside housing 605 to travel outside housing 605.

Figure 7:
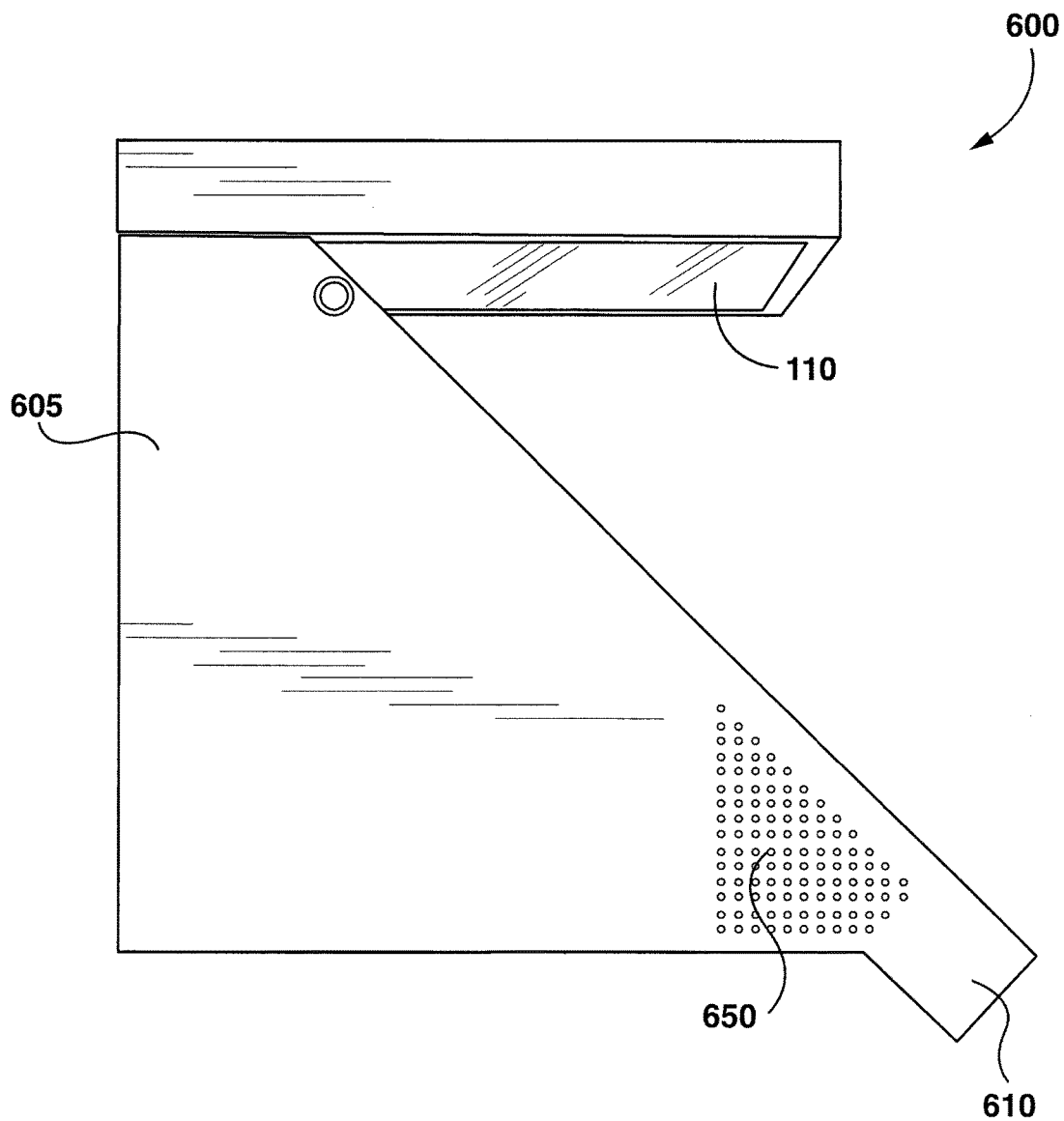
FIG. 7 depicts a side view of the device of FIG. 6.

FIG. 7 shows a side view of device 600, showing housing 605 supporting first display 110 and comprising display guard 610 and openings 650.

Figure 8:
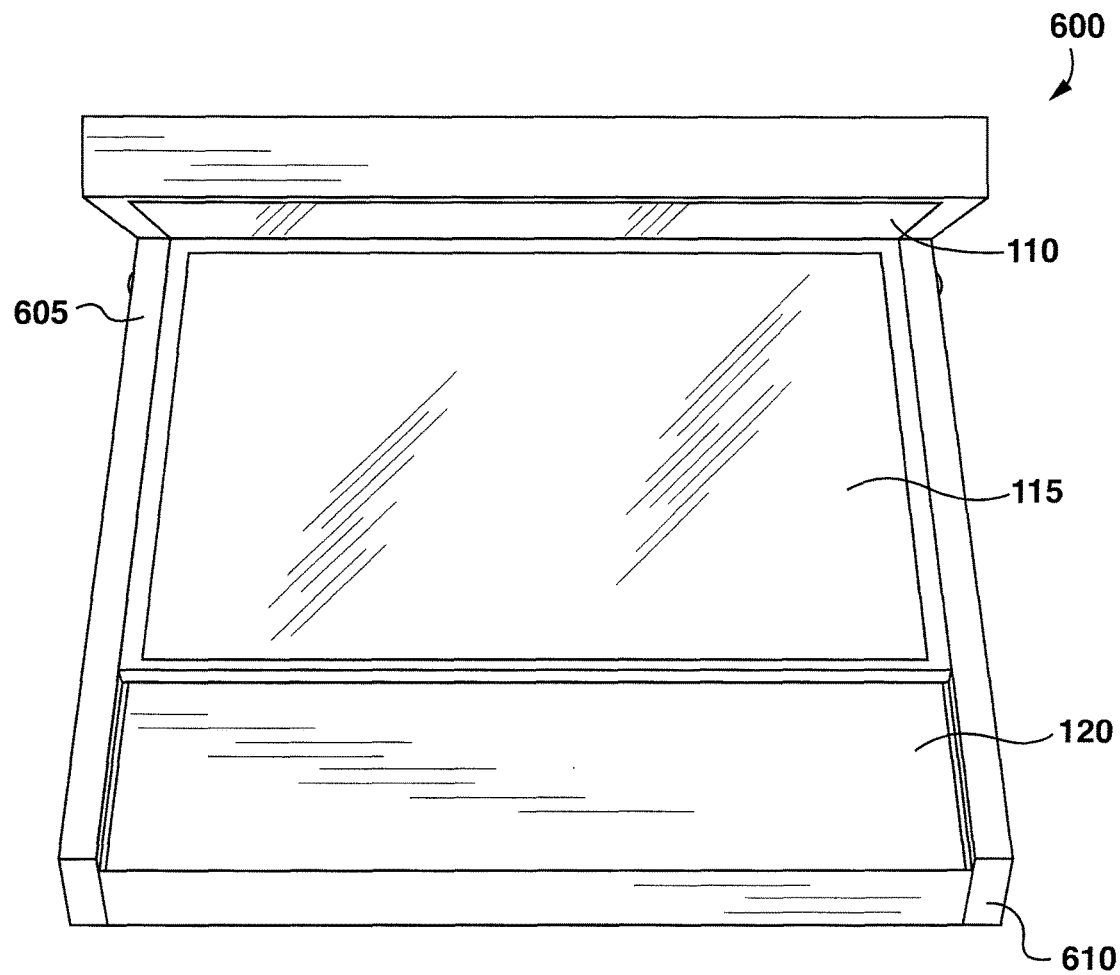
FIG. 8 depicts a front view of the device of FIG. 6.

FIG. 8 shows a front view of device 600, showing housing 605 supporting first display 110, reflector 115, and second display 120. FIG. 8 also shows display guard 610 surrounding and protecting edges of second portion 130 of second display 120.

Figure 9:
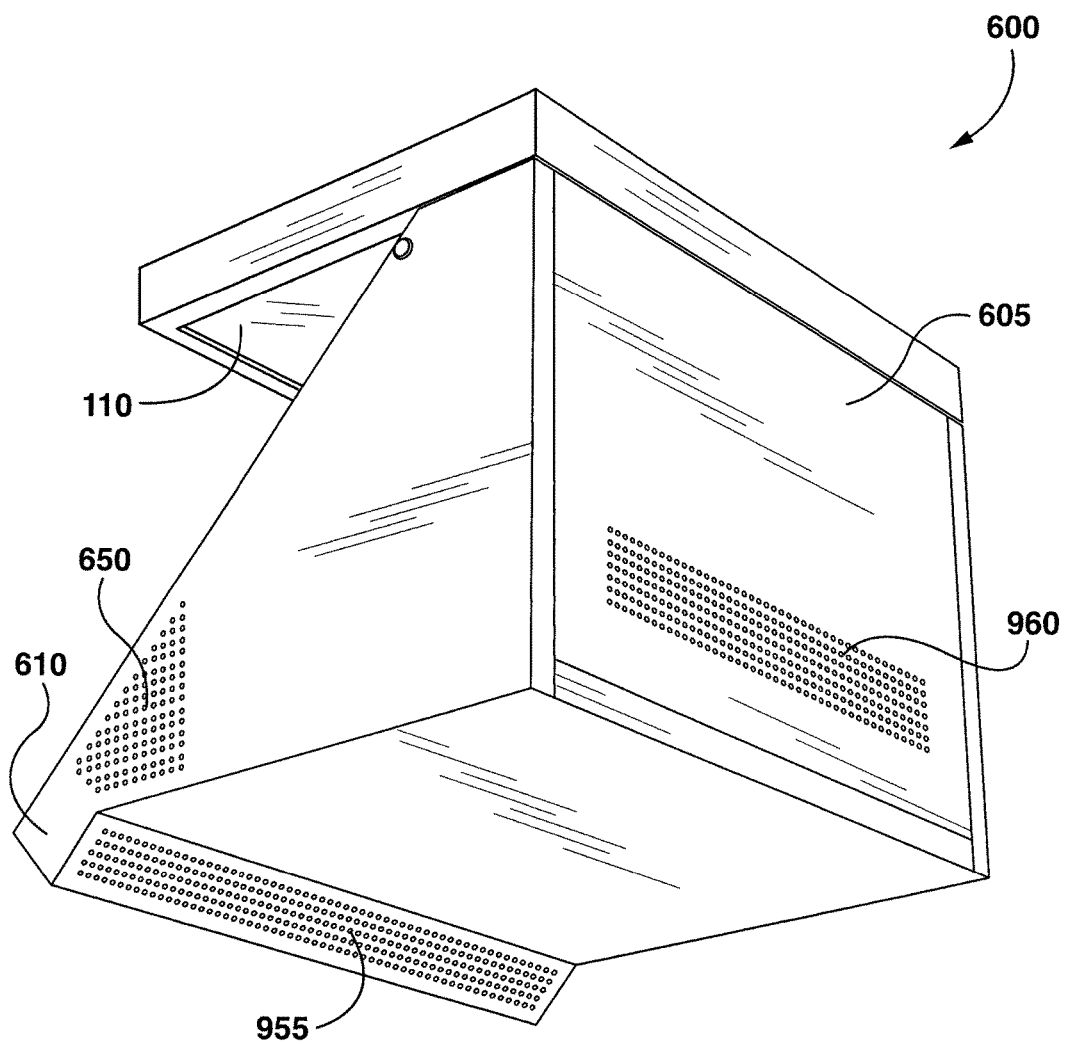
FIG. 9 depicts a bottom rear perspective view of the device of FIG. 6.

FIG. 9 shows a rear, bottom perspective view of device 600, comprising housing 605 supporting first display 110 and having openings 650. Housing 605 also comprises openings 955 in a bottom panel of housing 605 near edges of second portion 130 of second display 120. Openings 955 can be configured to facilitate sound to emerge from inside housing 605, and also to allow air to circulate into and out of housing 605 to cool the components inside housing 605. In addition, housing 605 can comprise openings 960 in a rear panel of housing 605. Openings 960 can perform a function similar to openings 955.

Figure 10:
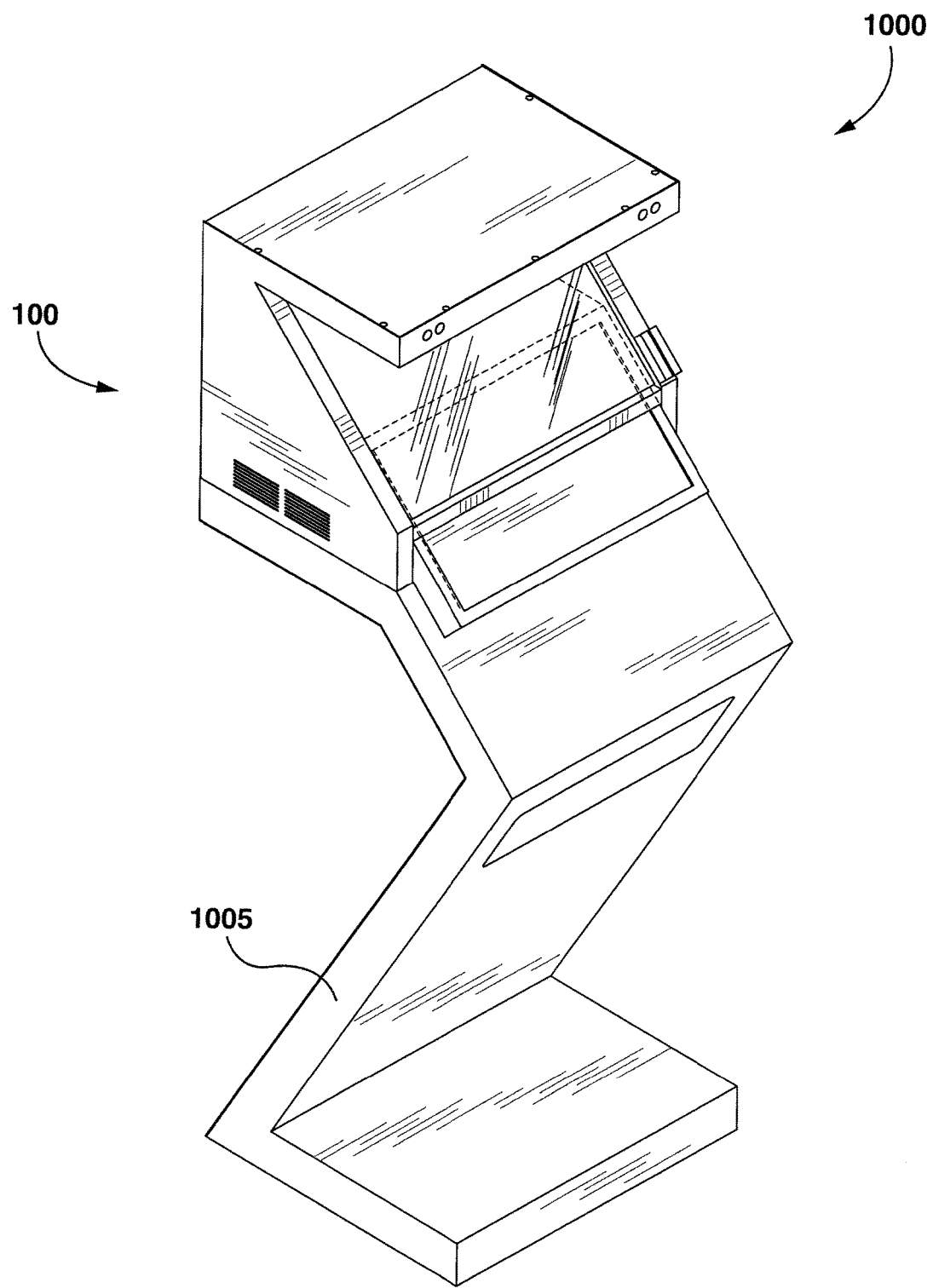
FIG. 10 depicts a top perspective view of another exemplary hybrid-image display device, according to non-limiting implementations.

FIG. 10 shows a top perspective view of another implementation of the hybrid-image display device 1000. Device 1000 comprises display device 100 secured to a stand 1005. Stand 1005 can be of any shape or dimension so long as stand 1005 can support device 100 at a height at which a user can view the hybrid image formed by device 100 and can give input to device 100 and interact with the hybrid image. In other implementations, instead of device 100, device 600 can be secured to stand 1005. In yet other implementations, stand 1005 can have an adjustable height to adjust the level of device 100 or device 600 for the height of each user.

While devices 100 and 600 are exemplary implementations of the hybrid-image display device, other variations and implementations are also possible. For example, and without limiting the possible implementations and variations, one or more of the first display and the second display can comprise any other suitable light source. For example, a light projector can be used instead of a display. In general, the first and second displays can comprise any light source capable of emitting light and producing an image.

In addition, while in devices 100 and 600 second portion 130 of second display 120 acts as the input terminal to receive touch input from the user, it is contemplated that any other type of input terminal can be used. For example, the input terminal can be separate from the first portion 125 of second display 120, i.e. second display 120 may not have a second portion 130. The input terminal can comprise a keypad, a mouse, a joystick, a pedal, a controller, a touch screen separate from second display 120, a mobile device, or any other suitable input device configured to receive input from the user.

In implementations where the input terminal comprises a control screen, the control screen can be configured to display a user interface and to receive a touch input from the user through the control interface. The input interface can be generated and/or controlled by one or more of controllers 510,515. Controllers 510,515 can detect the input from the user, and in response control one or more of the first and second displays, the first and second internal surface light sources (i.e. the back light and the stage light), and the sound emitter. Controllers 510,515 can also change the user interface based on the input from the user. The user interface can comprise one or more dynamic input zones configured to receive the touch input, where receiving the touch input can trigger corresponding changes in an appearance of at least one of the input zones. The dynamic input zones can comprise touch zones, whereby touching anywhere in that zone constitutes a given selection by the user.

In implementations where the input terminal comprises second portion 130 of second display 120, second portion 130 extends beyond the perimeter of reflector 115 thereby allowing second portion 130 to receive touch input unobstructed by reflector 115.

Moreover, while in devices 100 and 600 first portion 125 and second portion 130 are shown as being two rectangular portions of about comparable size, the respective shapes and relative sizes of the first and second portions can be different. For example, the boundary between the first and second portions can be sloped, curved, jagged, or otherwise irregularly shaped. In other words, the edge of reflector 115 which defines the boundary between first and second portions can be slopped, curved, jagged, or otherwise irregularly shaped. In implementations where the second light source and the input terminal are not portions of the same display, the second light source and the input terminal and be separated and/or spaced from one another.

In addition, in implementations where the second light source comprises a display and the input terminal comprises a touch screen, it is contemplated that the display and the touch screen may not be coplanar or disposed on parallel planes. For example, the angle and orientation of the second display can be selected to optimize forming the hybrid image, whereas the angle and orientation of the touch screen input terminal can be selected to optimize displaying a user interface to and receiving touch input from the user.

In device 100 (and also device 600), the projection of reflector 115 onto the plane defined by first display 110 can have dimensions comparable to dimensions of first display 110 and can overlay first display 110; see FIG. 2. This, in turn, can allow for all or substantially all the light emitted by first display 110 in direction 205 to be intercepted by reflector 115, and potentially reflected in the output direction 210 and useable to generate the hybrid image. Moreover, referring again to FIG. 2, a width of first portion 125 can be about commensurate with width of reflector 115, also to allow for all or substantially all of the light emitted by first portion 125 to be incident upon reflector 115, and potentially transmitted in the output direction 210 and useable to form the hybrid image. The "width" can be the dimension in the out-of-page direction, i.e. the direction perpendicular to the direction 205 and to the output direction 210.

In some implementations, the hybrid-image display device can also comprise an output terminal configured to connect to auxiliary sources of one or more of light, sound, smell, physical movement, and materials. These auxiliary sources can be external to the display device. The output terminal can be configured to allow the input from the user and/or the controllers to control one or more of the auxiliary sources. In this manner, the user can also interact with the environment external to and/or surrounding the display device. In addition, the sounds and images produced by the display device can be synchronized with the effects produced by the auxiliary sources to produce a multi-sensory effect on the user.

Moreover, while device 100 is depicted as having magnetic card reader 145, in some implementations an RFID and/or chip card reader/writer can be used in addition and/or instead of magnetic card reader 145. In yet other implementations, a bar code reader can be used in addition and/or instead of magnetic card reader 145.

In some implementations, the hybrid-image display device can have wired or wireless data connectivity ability, for example using a network card in communication with one or more controllers 510,515. Network data connectivity can allow the display device to be remotely programmed, for example by utilizing remote content changeability. In addition, data connectivity can allow the display device to communicate and/or pair with a mobile device of a user in order for the user to control the display device and/or for the display device to display content from the user's mobile device such as a smartphone and smart wearable device.

In some implementations, controllers 510,515 have stored in their memory a collection of pre-recorded image sets or videos. Based on the input, the controllers can apply their internal programming to determine which content to play, which display(s) to play it on, and over which set of pixels on each display to play that content. This eliminates the need to render images and/or video on the fly and reduces the computing and power needs of device 100. This can also increase speed and enhance responsiveness of device 100. In other implementations, the controllers can render video on the fly based on the input from the user.

Figure 11:
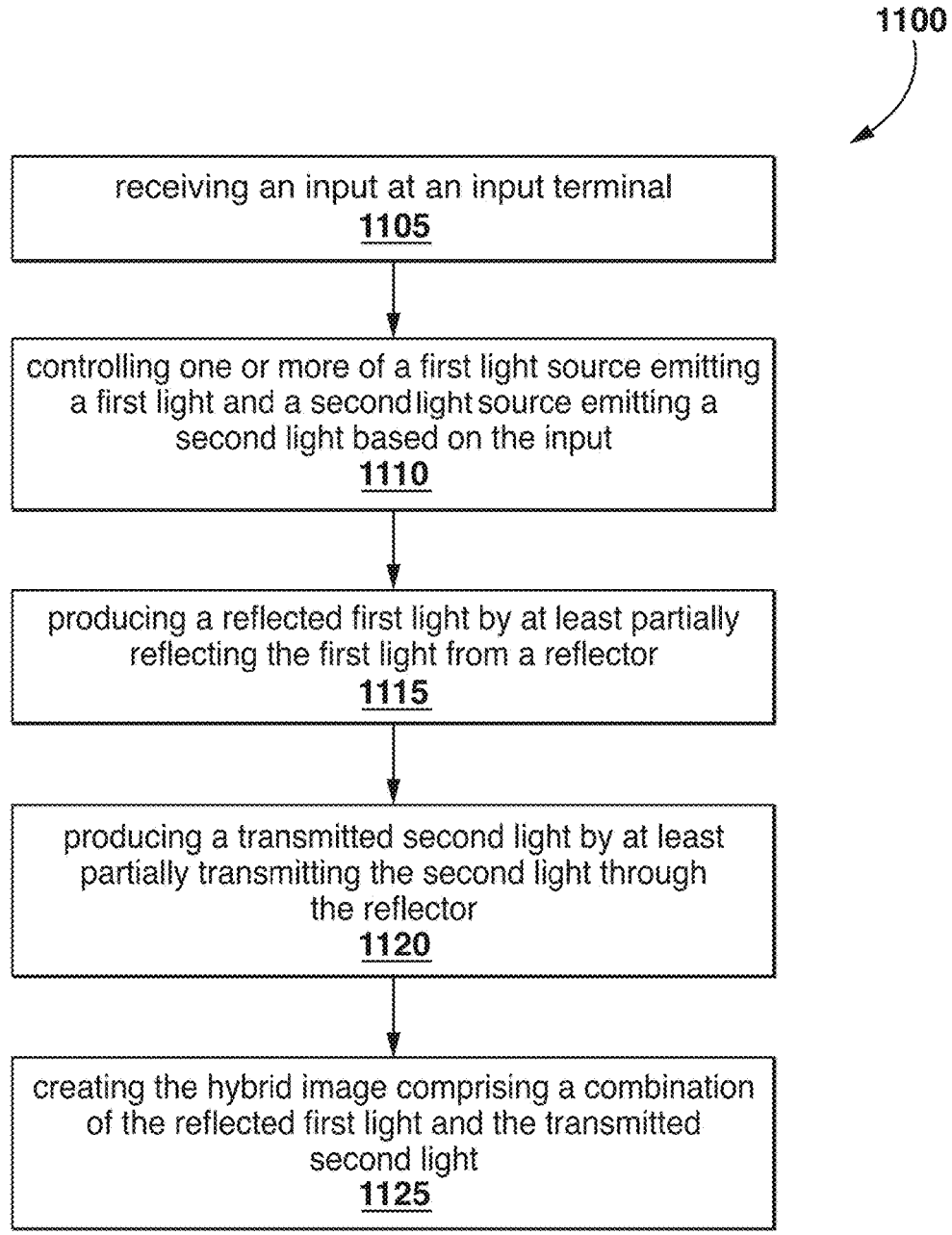
FIG. 11 depicts a flow chart showing steps of a method of creating a hybrid image, according to non-limiting implementations.

FIG. 11 shows in a flow chart the steps in an exemplary method 1100 for creating a hybrid image, such as the hybrid images that can be formed by the hybrid-image display devices described herein. In step 1105, an input is received at the input terminal. An exemplary input can comprise, but is not limited to, input from a user and/or viewer. In step 1110, based on the input, a first light source emitting a first light is controlled and/or a second light source emitting a second light is controlled. An exemplary first light source can comprise, but is not limited to, first display 110. An exemplary second light source can comprise, but is not limited to, first portion 125 of second display 120. For example, first light can comprise, but is not limited to, light X and second light can comprise, but is not limited to, light Y as shown in FIG. 2.

In step 1115, a reflected first light is produced by at least partially reflecting the first light from a reflector. For example, the reflected first light can comprise, but is not limited to, light X'. The reflector can comprise, but is not limited to, reflector 115. In step 1120, a transmitted second light is produced by at least partially transmitting the second light through the reflector. For example, the transmitted second light can comprise, but is not limited to, light Y'. In step 1125, the hybrid image is created comprising a combination and/or a layering of the reflected first light and the transmitted second light.

The input terminal can comprise a control screen and the receiving the input can comprise displaying a user interface on the control screen and receiving a touch input at the control screen.

In some implementations, the second light source can comprise a first portion of a display and the control screen can comprise a second portion of the same display. For example, as in the case of devices 100 and 600, the second light source can comprise first portion 125 of second display 120 and the control screen can comprise second portion 130 of second display 120. In some implementations, for example devices 100 and 600, first portion 125 and second portion 130 are not separate displays, but merely represent different sets of pixels of the same second display 120 which sets of pixels perform different functions: first portion 125 functions as the second light source whose light is transmitted through reflector 115 to contribute to forming of the hybrid image, whereas second portion 130 functions to display a user interface to the user and to receive touch input through the user interface from the user.

In some implementations, method 1100 further comprises displaying one or more dynamic input zones on the control screen, where the dynamic input zones are configured to receive the touch input. The input zones are visual zones which are dynamic in the sense that once a touch input is received, the appearance of at least one of the input zones can be changed in response to the touch input. In a device like device 100, this change of appearance can be performed by one or more of controllers 510,515.

In some implementations, method 1100 can further comprise sensing one or more of motion and proximity in the vicinity of one or more of the first light source, the second light source, and the reflector; and controlling one or more of the first light source and the second light source based on one or more of the sensed motion and proximity. For example, in device 100, proximity sensor 135 and motion sensor 140 can be used to detect user proximity or motion near device 100, and then communicate their output to one or more of controllers 510,515, which controllers in turn control first display 110 and second display 120 to change one or more of the hybrid image and the user interface.

Method 1100 can also comprise one or more of: illuminating a first surface using a first surface light source, the first surface disposed at a first angle to the reflector, and illuminating a second surface using a second surface light source, the second surface disposed at a second angle to the reflector, the second angle different from the first angle. In the non-limiting example of device 100, the first surface can comprise surface 220, the first surface light can comprise internal surface light source 505, the second surface can comprise surface 225, and the second surface light can comprise internal surface light source 230. The hybrid image can comprise the combination and/or layering of the reflected first light and the transmitted second light combined and/or layered with one or more of a first surface light emanating from the first surface and transmitted through the reflector, and a second surface light emanating from the second surface and transmitted through the reflector. In the non-limiting example of device 100, light Z' can represent one or more of a first surface light emanating from the first surface and transmitted through the reflector, and a second surface light emanating from the second surface and transmitted through the reflector.

In some implementations, these first and second surface light sources can be controlled by the input from the user. For example, in the non-limiting case of device 100, the input can be communicated to one or more of controllers 510,515 which can in turn control one or more of internal surface light sources 230 and 505.

The method can further comprise using a sound emitter to produce one or more sounds based on the input. In the non-limiting example of device 100, the sound emitter can comprise sound emitter 530.

In some implementations, the method can further comprise synchronizing with each other two or more of the first light source, the second light source, the first surface light source, the second surface light source, and the sound emitter to produce a hybrid presentation. This hybrid presentation can comprise a hybrid audio-visual presentation.

In some implementations, one or more of the first light source and the second light source comprises a display having a plurality of pixels. Non-limiting examples include LCD, LED, OLED, and plasma displays which comprise addressable pixels. Step 1110 can comprise selecting, based on the input a given set of one or more images from a library of sets of images for being displayed by one or more of the first light source and the second light source. In addition and/or in the alternative, step 1110 can comprise selecting, based on the input, a given number of and given coordinates of the pixels of one or more of the first light source and the second light source for displaying the given set of one or more images.

For example, based on the input, one or more of controllers 510,515 can select an image or a set of images (e.g. in the form of video) to display on one or more of first display 110 and second display 120. The controllers can also decide which subset of pixels (i.e. number and coordinate of pixels) should be used to display that content. The content can be selected from a library of pre-recorded or pre-rendered images and videos to reduce the computation and power needs of implementing this step and to enhance responsiveness.

Method 1100 can further comprise controlling, based on the input, one or more auxiliary sources of one or more of light, sound, smell, physical movement, and materials.

The methods described herein, including method 1100, are not limited to being performed on any of the devices described herein. The steps of these methods are described in reference to components of devices 100 and 600 for demonstrative purposes only. These methods can be performed using any suitable components and apparatuses.

The devices and method of the present specification can allow a user to interact and engage with a hybrid image having a 3D appearance. The hybrid image can allow the user to visually inspect various aspects of the objects represented in the hybrid image and to receive additional information about those objects that would not be readily available from a 2D image or video. Such interactive, 3D hybrid images can produce in the user a perception of tactile interaction with an object, as the user is able to manipulate a 3D representation of the object using touch input.

In the retail marketing context, the devices and methods of the present specification can enable merchants to attract and educate the consumer through a new marketing platform that allows for a higher profile within the retail environment and for interaction between the consumer and the (representations of) their products without the need for the physical products being present.

The above-described implementations are intended to be examples of the present invention and alterations and modifications may be effected thereto, by those of skill in the art, without departing from the scope of the invention which is defined solely by the claims appended hereto.

We claim:

1. An apparatus for creating a hybrid image, the apparatus comprising:
   a first light source configured to emit a first light in a first direction;
   a reflector disposed to intercept the first light, the reflector configured to at least partially reflect the first light in an output direction to produce a reflected first light;
   a second light source configured to emit a second light, the reflector configured to at least partially transmit the second light in the output direction to produce a transmitted second light; and
   an input terminal configured to receive an input used to control one or more of the first light source and the second light source;
   wherein:
     the hybrid image comprises a combination of the reflected first light and the transmitted second light;
     the input terminal comprises a control screen configured to display a user interface;
     the input comprises a touch input received through the user interface;
     the second light source comprises a first portion of a display disposed on a side of the reflector opposite the output direction, the first portion covered by the reflector; and
     the control screen comprises a second portion of the display, the second portion extending beyond a perimeter of the reflector thereby allowing the second portion to receive the touch input unobstructed by the reflector.

2. The apparatus of claim 1, wherein the user interface comprises one or more dynamic input zones configured to receive the touch input, receiving the touch input triggering changes in an appearance of at least one of the input zones.

3. The apparatus of claim 1, wherein the reflector is disposed at about 450 to the first direction.

4. The apparatus of claim 1, further comprising one or more of a motion sensor and a proximity sensor configured to sense motion and proximity respectively in the vicinity of the apparatus.

5. The apparatus of claim 1, wherein the second light source comprises a display oriented about parallel to the reflector.

6. The apparatus of claim 1, further comprising:
   a first surface disposed at a first angle to the reflector, the first surface disposed on a side of the reflector opposite the output direction; and
   a first surface light source configured to illuminate at least a portion of the first surface.

7. The apparatus of claim 6, further comprising:
   a second surface disposed at a second angle to the reflector, the second surface disposed on the side of the reflector opposite the output direction, the second angle different from the first angle; and
   a second surface light source configured to illuminate at least a portion of the second surface.

8. The apparatus of claim 7, wherein at least one portion of one or more of the first surface and the second surface is at least partially translucent to human-visible light, the at least one portion configured to be backlit by its corresponding one of the first surface light source and the second surface light source.

9. The apparatus of claim 7, wherein one or more of the first surface and the second surface comprises one or more of a fabric and an acrylic material.

10. The apparatus of claim 7, wherein one or more of the first surface light source and the second surface light source is controlled by the input.

11. The apparatus of claim 7, wherein the hybrid image comprises the combination of the reflected first light and the transmitted second light combined with one or more of a first surface light emanating from the first surface and a second surface light emanating from the second surface.

12. The apparatus of claim 1, further comprising a sound emitter controlled by the input.

13. The apparatus of claim 1, further comprising an output terminal configured to connect to auxiliary sources of one or more of light, sound, smell, physical movement, and materials, the auxiliary sources external to the apparatus, the output terminal configured to allow the input to control one or more of the auxiliary sources.

14. The apparatus of claim 1, further comprising one or more of a payment information reader and an identification information reader configured to read payment information and identification information respectively and control one or more of the first light source and the second light source based on one or more of the payment information and the identification information.

15. A method of creating a hybrid image, the method comprising: receiving an input at an input terminal;
   controlling one or more of a first light source emitting a first light and a second light source emitting a second light based on the input;
   producing a reflected first light by at least partially reflecting the first light from a reflector;
   producing a transmitted second light by at least partially transmitting the second light through the reflector; and creating the hybrid image comprising a combination of the reflected first light and the transmitted second light;
wherein: the input terminal comprises a control screen;
the receiving the input comprises:
displaying a user interface on the control screen; and
receiving a touch input at the control screen; and
the second light source comprises a first portion of a display and the control screen comprises a second portion of the display,
the second portion extending beyond a perimeter of the reflector thereby allowing the second portion to receive the touch input unobstructed by the reflector.

16. The method of claim 15, further comprising:
displaying one or more dynamic input zones on the control screen, the dynamic input zones configured to receive the touch input; and
changing an appearance of at least one of the input zones in response to the touch input.

17. The method of claim 15, further comprising:
sensing one or more of motion and proximity in the vicinity of one or more of the first light source, the second light source, and the reflector; and
controlling one or more of the first light source and the second light source based on one or more of the sensed motion and proximity.

18. The method of claim 15, further comprising:
one or more of:
   illuminating a first surface using a first surface light source, the first surface disposed at a first angle to the reflector; and
   illuminating a second surface using a second surface light source, the second surface disposed at a second angle to the reflector, the second angle different from the first angle; and
wherein the hybrid image comprises the combination of the reflected first light and the transmitted second light combined with one or more of:
   a first surface light emanating from the first surface and transmitted through the reflector, and
   a second surface light emanating from the second surface and transmitted through the reflector.

19. The method of claim 18, further comprising:
controlling one or more of the first surface light source and the second surface light source based on the input.

20. The method of claim 18, further comprising producing, using a sound emitter, one or more sounds based on the input.

21. The method of claim 20, further comprising synchronizing with each other two or more of the first light source, the second light source, the first surface light source, the second surface light source, and the sound emitter to produce a hybrid presentation.

22. The method of claim 15, wherein
one or more of the first light source and the second light source comprises a display having a plurality of pixels; and
the controlling comprises selecting, based on the input, one or more of
   a given set of one or more images from a library of sets of images for being displayed by one or more of the first light source and the second light source; and
   a given number of and given coordinates of the pixels of one or more of the first light source and the second light source for displaying the given set of one or more images.

23. The method of claim 15, further comprising controlling, based on the input, one or more auxiliary sources of one or more of light, sound, smell, physical movement, and materials.

* * * * *